(12) United States Patent
Gruessing et al.

(10) Patent No.: US 7,884,209 B2
(45) Date of Patent: Feb. 8, 2011

(54) USE OF BORA-TETRAAZAPENTALENES

(75) Inventors: Andre Gruessing, Mannheim (DE); Horst Hartmann, Dresden (DE)

(73) Assignee: Novaled AG, Dresden (DE)

( * ) Notice: Subject to any disclaimer, the term of this patent is extended or adjusted under 35 U.S.C. 154(b) by 165 days.

(21) Appl. No.: 12/295,195

(22) PCT Filed: Mar. 30, 2007

(86) PCT No.: PCT/DE2007/000587

§ 371 (c)(1),
(2), (4) Date: Jan. 27, 2009

(87) PCT Pub. No.: WO2007/115540

PCT Pub. Date: Oct. 18, 2007

(65) Prior Publication Data

US 2010/0234608 A1    Sep. 16, 2010

(30) Foreign Application Priority Data

Mar. 30, 2006 (DE) .................... 10 2006 014 750

(51) Int. Cl.
C07F 5/02 (2006.01)
(52) U.S. Cl. .................................... 548/110
(58) Field of Classification Search .............. None
See application file for complete search history.

(56) References Cited

U.S. PATENT DOCUMENTS

| | | |
|---|---|---|
| 5,792,568 A | 8/1998 | Emoto et al. |
| 6,908,783 B1 | 6/2005 | Kuehl et al. |
| 6,984,591 B1 | 1/2006 | Buchanan et al. |
| 2002/0042174 A1 | 4/2002 | Kunugi et al. |
| 2002/0179885 A1 | 12/2002 | Che et al. |
| 2003/0186080 A1 | 10/2003 | Kamatani et al. |
| 2003/0205707 A1 | 11/2003 | Chi-Ming |
| 2004/0065544 A1 | 4/2004 | Igarashi et al. |
| 2004/0121184 A1 | 6/2004 | Thompson et al. |
| 2004/0241492 A1 | 12/2004 | Tokuda et al. |
| 2004/0262576 A1 | 12/2004 | Thompson et al. |
| 2005/0221115 A1 | 10/2005 | Tsuboyama et al. |
| 2005/0260449 A1 | 11/2005 | Walters et al. |
| 2006/0071206 A1 | 4/2006 | Spreitzer et al. |
| 2006/0208252 A1 | 9/2006 | Wessels et al. |
| 2006/0258043 A1 | 11/2006 | Bold et al. |
| 2007/0111025 A1 | 5/2007 | Lennartz et al. |
| 2007/0135635 A1 | 6/2007 | Stoessel et al. |
| 2007/0264524 A1 | 11/2007 | Gessner et al. |
| 2008/0121870 A1 | 5/2008 | Marder et al. |
| 2009/0318698 A1 | 12/2009 | Hartmann et al. |

FOREIGN PATENT DOCUMENTS

| | | |
|---|---|---|
| DE | 4112793 | 10/1992 |
| GB | 1436230 | 5/1976 |
| JP | 03208689 | 9/1991 |
| WO | WO 2004/017043 | 2/2004 |
| WO | WO 2005/086251 | 9/2005 |

OTHER PUBLICATIONS

Adachi, C. et al. "High-efficiency red electrophosphorescence devices," Appl. Phys. Lett. 2001, 78, 1622.
Beckert, R. et al., "Syntheses and properties of cycloamidines based on 4H-imidazoles," Z. Naturforschung B, vol. 61, No. 4 (2006).
Blochwitz, J., et al., "Low voltage organic light emitting diodes featuring doped phthalocyanine as hole transport material," Applied Physics Letters, vol. 73, No. 6, Aug. 10, 1998, pp. 729-731.
Chassot, L. and Von Zelewsky, A., "Cyclometalated Complexes of Platinum (II): Homoleptic Compounds with Aromatic C, N Ligands," Inorg. Chem. (1987), 26, 2814-2818.
Cocchi, M. et al., "Highly efficient organic electroluminescent devices based on cyclometallated platinum complexes as new phosphorent emitters," Synthetic Metals, 147, 253-256, (2004).
Cocchi, M. et al., "Highly efficient organic electroluminescent light-emitting diodes with a reduced quantum efficiency roll off at large current densities," Applied Physics Letters, 84, 7, 1052-1054 (2004).
Davison, A. et al., "Further Examples of Complexes Related by Electron-Transfer Reactions: Complexes Derived from Bis9trifluoromethyl)-1,2-dithietene," Inorg. Chem. (1964) 3/6 p. 814.
Denmark, S. et al., "Cyclopropanation with Diazomethane and Bis(Oxazoline) Palladium (II) Complexes," Journal of Organic Chemistry, 62, No. 10, May 16, 1997.
Doucet, et al., "Palladium-Based Catalytic Systems for the Synthesis of Conjugated Enynes by Sonogashira Reactions and Related Alkynylations," Angew. Chem. Int. Ed. (2007) 46, 834.

(Continued)

Primary Examiner—Yong Chu
Assistant Examiner—Michael Barker
(74) Attorney, Agent, or Firm—Sutherland, Asbill & Brennan, LLP

(57) ABSTRACT

The present invention relates to the use of bora-tetraazapentalenes with the general formula A

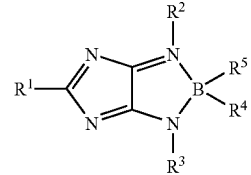

Formula A as redox-dopant and/or emitter in electronic, optoelectronic or electroluminescent structural elements.

16 Claims, No Drawings

OTHER PUBLICATIONS

Gareau, Y. et al. "Free Radical Reaction of Diisopropyl Xanthogen Disulfide with Unsaturated Systems," Heterocycles (1998) 48, p. 2003.

Gebauer, T. et al., "Mesoionic bora-tetraazapentalenes—fully reversible two step redox systems," Chemical Communications (2004), (16), 1860-1861.

Huang et al., "Synthesis of Perfluoro-2-alkynenitriles," Tetrahedron Letters (1981) 22, p. 5283.

Krebs et al., "Strained Cyclic Acetylenes, VII Addition of Sulfur and Pyridine-N-Oxide to Seven Membered Cycloalkynes," Heterocycles (1979) 12, p. 1153.

Krespan, C.G.; "Bis-(polyfluoroalkyl)-acetylenes. IV. Fluorinated Dithietenes and Related Heterocyclic Compounds From Bis-(polyfluoroalkyl)-acetylenes and Sulfur," J.Am. Chem. Soc. (1961) 83, 3434.

Lo, K. M., et al., "Synthesis and spectroscopic studies of thienyl triorganotin (IV) compounds," J. Organometal. Chem. (1992), 430, 149.

Marder et al., "Synthesis, Optical Properties, Crystal Stuctures and Phase Behavior of Selectively Fluorinated 1,4-bis(4'-pyridylethynyl)benzenes, 4-(phenylethynyl)pyridines and 9,10-bis(4'-pyridylethynyl)-anthracene, and a $Zn(NO_3)_2$ Coordination Polymer," J. Mater. Chem. (2004) 14, 2395.

Mayer, R., et al. "Synthese der 1,3-Dithiol-2-thione," Angew. Chem. (1964) 76, p. 143.

Nakayama, J. et al., "A Convenient Synthesis of 1,2-Dithietes and 1,2-Dithioxo Compounds Stabilized by Buttressing and Resonance Effects, Respectively, by Sulfuration of Alkynes with Elemental Sulfur," Bull. Chem. Soc. Jpn. (1993) 66, p. 623.

Okada, S. et al. "Substituent effects of iridium complexes for highly efficient red OLEDs," Dalton Trans., 2005, 1583.

Pereira, R. P. et al., "Electrosynthesis and characterization of polypyrrole doped with [Bi(dmit)2]<->," Synthetic Metals, Apr. 20, 2005, p. 21-26.

Pfeiffer, M. et al., "Controlled doping of phthalocyanine layers by cosublimation with acceptor molecules: A systematic Seebeck and conductivity study," Applied Physics Letters, vol. 73, No. 22 Nov. 20, 1998, pp. 3202-3204.

Schrauzer, et al. "Preparation, Reactions, and Structure of Bisdithio-α-diketone Complexes of Nickel, Palladium, and Platinum," J. Am. Chem. Soc. (1965) 87/7 1483-9.

Schrauzer, et al., "Reaktionen von Ubergangsmetallsulfiden mit Alkinen. Zur Kenntnis von Metallkomplexen der α-β-Dithiodiketone," Z. Naturforschg. (1964) 19b, 192-8.

Shinar, J. "Organic Light-Emitting Devices—A Survery," AIP-Press, Springer, New York 2004.

Sonogahsira, et al., "A Convenient Synthesis of Acetylenes: Catalytic Substitutions of Acetylenic Hydrogen with Bromoalkenes, Iodoarenes, and Bromopyridines." Tetrahedron Letters (1975) 50, 4467.

Sotoyama, W. et al. "Efficient organic light-emitting diodes with phosphorescent platinum complexes containing N-C-N-coordinating tridentate ligand," Appl. Phys. Lett. 2005, 86, 153505.

Taguchi, et al., "Comparison of p-type and n-type organic field-effect transistors using nickel coordination compounds," Chemical Physics Letters, Apr. 15, 2006, p. 395-398.

Tang, C.W. et al., "Organic electroluminescent diodes," Applied Physics Letters, vol. 51, No. 12, Sep. 21, 1987, pp. 913-915.

Tarraga, A. et al., "Synthesis and electrochemical study of novel and oxazoloferrocene derivatives displaying redox-switchable character," Tetrahedron, 57, 31, Jul. 30, 2001, pp. 6765-6774.

Tung, Y. L. et al. "Organic light-emitting diodes based on charge-neutral Os(II) emitters: generation of saturated red emission with very high external quantum efficiency," J. Mater. Chem., 2005, 15, 460-464.

Yang, X. H. et al. "Polymer electrophosphorescence devices with high power conversion efficiencies," Appl. Phys. Lett. 2004, 84, 2476.

Yersin, H. and Donges, D. "Low-Lying Electronic States and Photophysical Properties of Organometallic Pd(II) and Pt(II) Compounds. Modern Research Trends Presented in Detailed Case Studies," Topics in Curr. Chem. (2001), 214, 81.

Yersin, H. "Highly Efficient OLEDs with Phosphorescent Materials," Wiley-VCH 2006.

International Search Report, International App. No. PCT/EP2007/006683, Nov. 13, 2007.

International Search Report, International App. No. PCT/EP2007/004638, Jul. 23, 2007.

International Search Report, International App. No. PCT/DE2006/002330, Apr. 24, 2007.

International Search Report, International App. No. PCT/DE2007/000587, Sep. 11, 2007.

Disclosure Under 37 CFR 1.56 U.S. Appl. No. 12/295,195 (Submitted Herewith), 2010.

USE OF BORA-TETRAAZAPENTALENES

The present invention relates to the use of boron complex compounds in electronic, optoelectronic and electroluminescent structural elements such as field-effect transistors, solar cells and organic light-emitting diodes (OLEDs), preferably as redox dopant and/or emitter, especially preferably as p-dopant and/or emitter.

In organic light-emitting diodes (OLEDs) the property of materials is used of emitting light when suitable charge carriers are formed by the applying of a voltage which form excited states in their recombination that pass under the emission of light into the base state. OLEDs represent an interesting alternative to cathode ray tubes and liquid crystal displays since they are suited due to their very compact construction and their low current consumption for the production of flat screens and displays for mobile applications such as mobile telephones, notebooks, PDAs, etc.

Organic light-emitting diodes (OLEDs) consist of different layers of organic materials in which at least one layer (emission layer) contains an electroluminescent substance that can be brought to emit light by the application of a voltage (C. W. Tang et al. Appl. Phys. Lett. 51, 913 (1987).

In order to improve the injection of the charge carriers into the emission layer and the temperature stability, charge transport layers of electron-conducting materials (electron conductors) respectively hole-conducting materials (hole conductors) are integrated into the OLED that can also function as blocker layers for the particular complementary charge carriers.

In accordance with the state of the art benzidine derivatives such as, e.g., N,N'-diphenyl-N,N'-bis(3-methylphenyl)-1,1'-biphenyl-4,4'-diamine (TPD), 4,4'-di-(N-carbazolyl)-diphenyl (CBP) and N,N'-di-(alpha-naphthyl)-N,N'-diphenyl-1,1'-biphenyl-4,4'-diamine (alpha-NPD) are used as hole-conducting respectively electron-blocking materials,

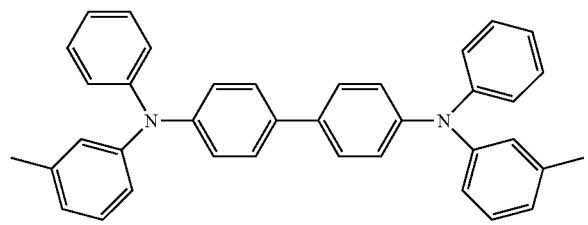

TPD

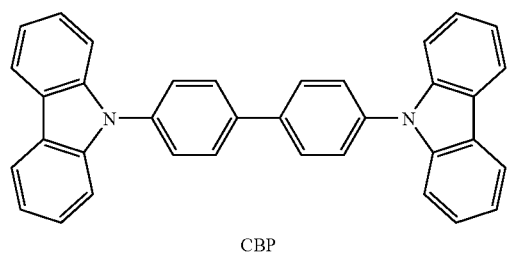

CBP

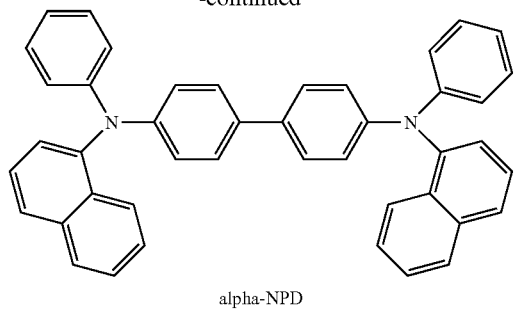

alpha-NPD

N,N',N"-perarylated starburst compounds such as TDATA, but also certain metal phthalocyanines such as zinc phthalocyanine (ZnPc) are known as further hole-conducting materials.

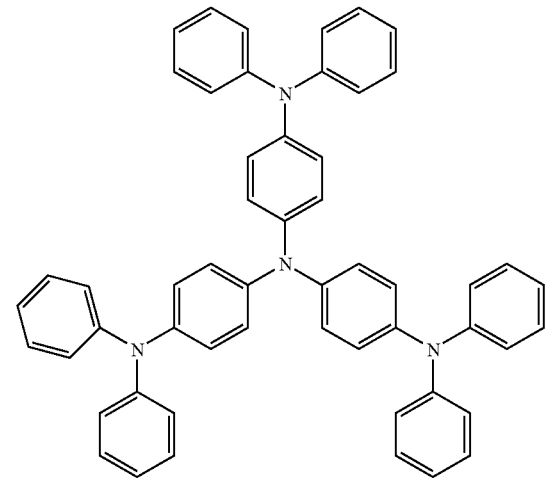

TDATA

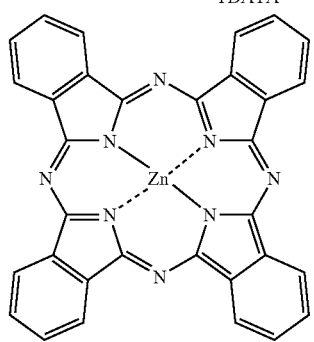

ZnPc

It has been known for several years in accordance with state of the art that organic semiconductors such as the hole-conducting materials used in OLEDs can be influenced as regards their electrical conductivity by redox doping. Here, in analogy with the doping of inorganic silicon semiconductors a change of the Fermi level of the semiconductor is achieved by the producing of charge carriers in the material.

For the redox doping of hole-conducting materials strong electron acceptors such as tetracyanoquinone dimethane (TCNQ), 2,3,5,6-tetrafluoro-1,4-tetracyanoquinone dimethane (F4-TCNQ) and further quinone derivatives as well as 1,3,2-dioxaborane have been described (M. Pfeiffer, A. Beyer, T. Fritz, K. Leo, Appl. Phys. Lett., 73 (22), 3202-3204 (1998); J. Blochwitz, M. Pfeiffer, T. Fritz, K. Leo, Appl. Phys. Lett., 73(6), 729-731 (1998); O. Kühl, H. Hartmann, O. Zeika, M. Pfeiffer, Y. Zheng, DE 10357044A1).

However, the compounds that previously became known in the state of the art have disadvantages for technical applications such as insufficient doping ability, i.e., insufficient electron acceptor properties, difficult control of the manufacturing processes due to insufficient volatility of the compounds or instability of the compounds relative to air moisture and oxygen. This results in undesired fluctuations of the product quality and aging effects when these compounds are used in electronic, optoelectronic and electroluminescent structural parts (such as, e.g., field effect transistors, solar cells and organic light emitting diodes).

The invention therefore has the basic task of overcoming the disadvantages of the state of the art and of making available organic materials for the redox doping of hole-conducting organic semiconductors (p-dopants) and/or as emitters that have a sufficient doping ability as well as a greater stability to air moisture and oxygen and can be more readily manipulated in the manufacturing process and in addition still possess emitter properties.

The task is solved by the use of bora-tetraazapentalene in accordance with the general formula A as redox dopant and/or emitter in an electronic, optoelectronic or electroluminescent structural element, which bora-tetraazapentalene has a structure according to formula A:

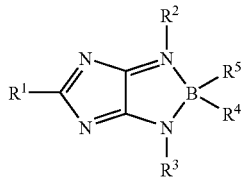

Formula A in which $R^1$, $R^2$ and $R^3$ are, independently of each other, hydrogen, any substituted or non-substituted alkyl, hetalkyl, aryl, hetaryl, anellated carbocycle or anellated heterocycle; and $R^4$ and $R^5$ are, independently of one another, halogen, hydrogen, any substituted or non-substituted alkyl, hetalkyl, aryl, hetaryl, anellated carbocycle or anellated heterocycle or are of such a nature that both jointly form a boron-containing heterocycle with the boron atom.

It is preferred that $R^1$, $R^2$ and $R^3$ are, independently of each other, substituted, especially halogenated, or unsubstituted carbocyclic aromatic groups, preferably substituted or non-substituted phenyl, 1-naphthyl, 2-naphthyl, 1-anthryl, 2-anthryl und 9-anthryl.

It is furthermore preferred that $R^1$, $R^2$ and $R^3$ are, independently of each other, quinoid substituents or substituents carrying quinoid groups.

It is furthermore preferred that $R^1$, $R^2$ and $R^3$ are, independently of each other, electron-attracting substituents or substituents carrying electron-attracting groups.

It is alternatively suggested that $R^1$, $R^2$ and $R^3$ are, independently of each other, substituted or non-substituted homologs of carbocyclic aromatic groups, preferably any linked and bound substituted or non-substituted biphenyl, binaphthyl, bianthryl and pyrenyl.

As a further alternative, it is provided that $R^1$, $R^2$ and $R^3$ are, independently of each other, substituted or non-substituted heteroaromatic groups, preferably substituted or non-substituted 2-pyridyl, 3-pyridyl, 4-pyridyl, 2-quinolyl, 3-quinolyl, 4-quinolyl, 5-quinolyl, 6-quinolyl, 7-quinolyl, 8-quinolyl, 2-thienyl und 3-thienyl.

A further alternative embodiment provides that $R^1$, $R^2$ and $R^3$ are, independently of each other, substituted or non-substituted homologs of heteroaromatic groups, preferably any linked and bound substituted or non-substituted bipyridyl, biquinolyl and bithienyl.

It is especially preferable that $R^4$ and $R^5$ are, independently of one another, substituted, especially halogenated, or unsubstituted carbocyclic aromatic groups, preferably substituted or non-substituted phenyl, 1-naphthyl, 2-naphthyl, 1-anthryl, 2-anthryl und 9-anthryl.

It is also preferred that $R^4$ and $R^5$ are, independently of one another, quinoid substituents or substituents carrying electron-attracting groups.

It is furthermore preferred that $R^4$ and $R^5$ are, independently of one another, electron-attracting substituents or substituents carrying electron-attracting groups.

It is alternatively suggested that $R^4$ and $R^5$ are, independently of one another, substituted or non-substituted homologs of carbocyclic aromatic groups, preferably any linked and bound substituted or non-substituted biphenyl, binaphthyl, bianthryl and pyrenyl.

As a further alternative, it is provided that $R^4$ and $R^5$ are, independently of one another, substituted or non-substituted heteroaromatic groups, preferably substituted or non-substituted 2-pyridyl, 3-pyridyl, 4-pyridyl, 2-quinolyl, 3-quinolyl, 4-quinolyl, 5-quinolyl, 6-quinolyl, 7-quinolyl, 8-quinolyl, 2-thienyl und 3-thienyl.

A further alternative embodiment provides that $R^4$ and $R^5$ are, independently of one another, substituted or non-substituted homologs of heteroaromatic groups, preferably any linked and bound substituted or non-substituted bipyridyl, biquinolyl and bithienyl.

A further embodiment provides that the two substituents $R^4$ and $R^5$ together with the boron atom form a correspondingly boron-containing heterocycle that can contain, in addition to carbon, even other heteroatoms such as in particular oxygen and nitrogen.

A further embodiment provides that the two substituents $R^4$ and $R^5$ have, independently of one another, the following substituted or non-substituted structure:

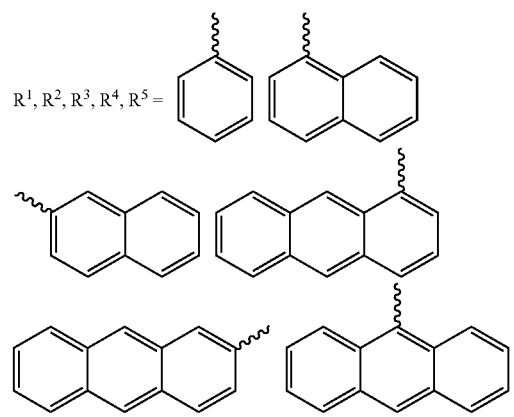

$R^1, R^2, R^3, R^4, R^5 =$

In a further preferred embodiment the substituents $R^1$, $R^2$, $R^3$, $R^4$ and $R^5$ can comprise, independently of each other, the following substituted or non-substituted structures:

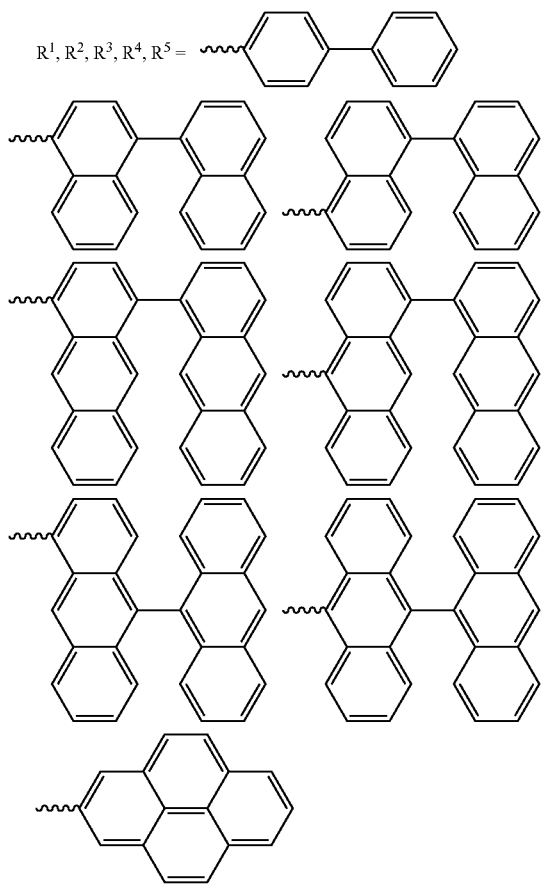

In yet a further preferred embodiment of the invention the substituents $R^1$, $R^2$, $R^3$, $R^4$ and $R^5$ can comprise, independently of each other, the following substituted or non-substituted structure:

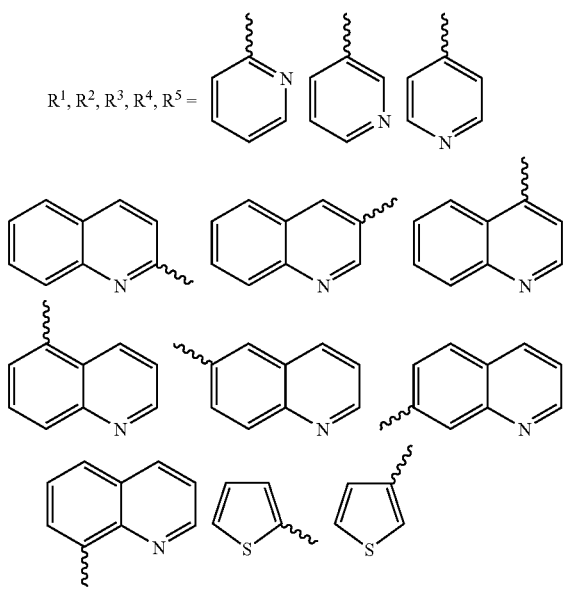

In a further preferred embodiment of the invention the substituents $R^1$, $R^2$, $R^3$, $R^4$ and $R^5$ can comprise, independently of each other, the following substituted or non-substituted structure:

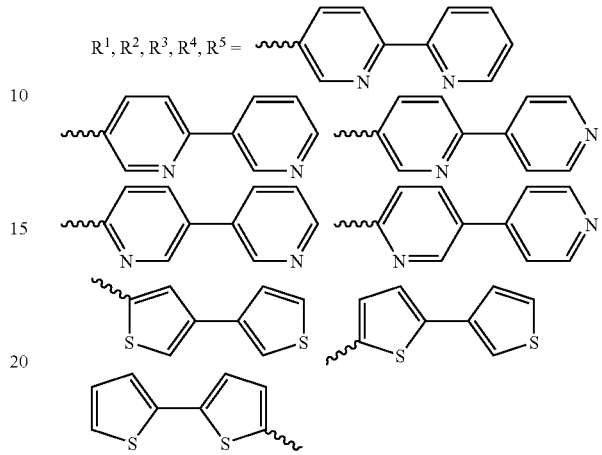

Finally, in a further preferred embodiment of the invention the substituents $R^4$ and $R^5$ form a boron-containing heterocycle with the boron atom, which can preferably comprise the following structural elements, in which the substituents $R^6$, $R^7$, $R^8$, $R^9$, $R^{10}$ and $R^{11}$ can be the same or different and can have the same meaning as $R^1$-$R^5$, but especially alkyl, aryl, hetaryl, halogen or alkoxy as well as aryloxy:

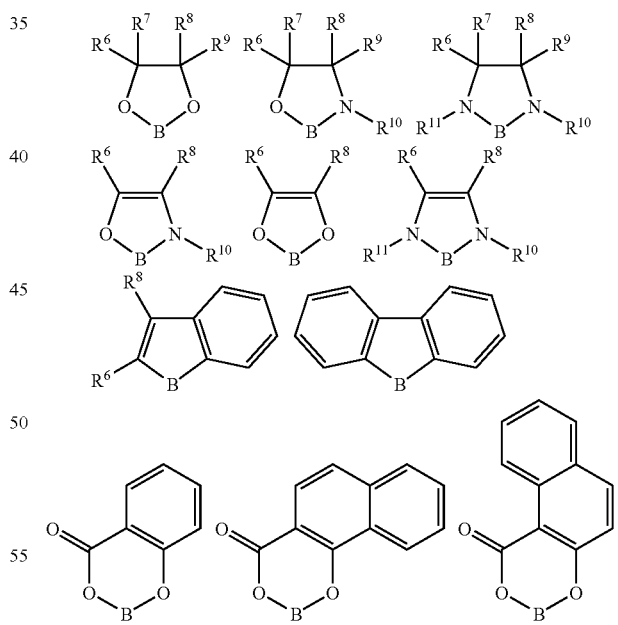

Suitable synthesis processes for producing the above-named compounds and their precursors are known to the person skilled in the art (T. Gebauer, R. Beckert, D. Weiss, K. Knop, C. Kaepplinger, H. Goerls, Chemical Communications (2004), (16), 1860-1861).

Finally, an electronic, optoelectronic or electroluminescent structural element is suggested in which bora-tetraazapentalenes are used in accordance with the invention.

The boron complexes are known from the complexes from the state of the art disclosed in T. Gebauer, R. Beckert, D. Weiss, K. Knop, C. Kaepplinger, H. Goerls, Chemical Communications (2004), (16), 1860-1861, but were previously not examined for their properties as p-doping agents as well as their use as emitter in OLEDs.

It was surprisingly established that the disclosed compounds have a very good doping ability as well as a greater stability to air moisture and oxygen, as result of which they can be more readily manipulated in the manufacturing process of an electronic, optoelectronic or electroluminescent structural element.

It was also established that the claimed compounds also have emitter properties in addition to their ability to dope hole-conducting materials. This results in the possibility of also using them as emitter materials in OLEDs.

The following invention is illustrated in detail in the following using an exemplary embodiment in which a doping is described, without being limited in any manner to this exemplary embodiment.

EXEMPLARY EMBODIMENT OF DOPING

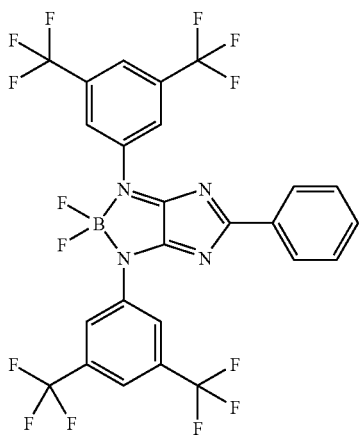

Ia

The compound Ia was synthesized according to T. Gebauer, R. Beckert, D. Weiss, K. Knop, C. Kaepplinger, H. Goerls, Chemical Communications (2004), (16), 1860-1861 and displays an intensely red photo luminescence with quantum yields of >60% as a function of the solvent used.

The commercially available zinc phthalocyanine (ZnPc) was doped with compound Ia and tested in conductivity measurements. In them, the doped layer was applied in the vacuum by co-evaporation via two approximately 14 mm wide contacts (of indium tin oxide, ITO) applied on a glass substrate in approximately 1.25 mm distance from one another. The contacts were outwardly connected to a current-voltage measuring apparatus, as a result of which the shunt current was able to be measured at a fixed applied voltage. The conductivity of the layer is then calculated from this shunt current according to a simple ohmic connection. The conductivity can be determined using the following equation:

conductivity=(shunt current×distance)(width×layer thickness×voltage).

The conductivity of a 50 nm thick layer of ZnPc doped with 10 mole % Ia is 1.3E-7 s/cm whereas the conductivity of a non-doped layer is less with <1 E-9 s/cm (measuring boundary) by at least two magnitudes.

The features disclosed in the previous description and the claims can be significant individually as well as in any combination for the realization of the invention in its different embodiments.

The invention claimed is:

1. A method for doping an electronic, optoelectronic or electroluminescent structural element, the method comprising doping the electronic, optoelectronic or electroluminescent structural element with a bora-tetraazapentalene redox dopant and/or emitter in accordance with the general formula A:

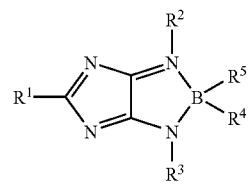

in which:
$R^1$, $R^2$ and $R^3$ are, independently of each other, hydrogen, any substituted or non-substituted alkyl, hetalkyl, aryl, hetaryl, anellated carbocycle or anellated heterocycle; and $R^4$ and $R^5$ are, independently of one another, halogen, hydrogen, any substituted or non-substituted alkyl, hetalkyl, aryl, hetaryl, anellated carbocycle or anellated heterocycle or are of such a nature that both jointly form a boron-containing heterocycle with the boron atom.

2. The method of claim 1, characterized in that $R^1$, $R^2$ and $R^3$ are, independently of one another, substituted, especially halogenated, or unsubstituted carbocyclic aromatic groups, preferably substituted or non-substituted phenyl, 1-naphthyl, 2-naphthyl, 1-anthryl, 2-anthryl, and 9-anthryl.

3. The method of claim 1, characterized in that $R^1$, $R^2$ and $R^3$ are, independently of each other, quinoid substituents or substituents carrying quinoid groups.

4. The method of claim 1, characterized in that $R^1$, $R^2$ and $R^3$ are, independently of each other, electron-attracting substituents or substituents carrying electron-attracting groups.

5. The method of claim 1, characterized in that $R^1$, $R^2$ and $R^3$ are, independently of each other, substituted or non-substituted homologs of carbocyclic aromatic groups, preferably any linked and bound substituted or non-substituted biphenyl, binaphthyl, bianthryl and pyrenyl.

6. The method of claim 1, characterized in that $R^1$, $R^2$ and $R^3$ are, independently of each other, substituted or non-substituted heteroaromatic groups, preferably substituted or non-substituted 2-pyridyl, 3-pyridyl, 4-pyridyl, 2-quinolyl, 3-quinolyl, 4-quinolyl, 5-quinolyl, 6-quinolyl, 8-quinolyl, 2-thienyl und 3-thienyl.

7. The method of claim 1, characterized in that that $R^1$, $R^2$ and $R^3$ are, independently of each other, substituted or non-substituted homologs of heteroaromatic groups, preferably any linked and bound substituted or non-substituted bipyridyl, biquinolyl and bithienyl.

8. The method of claim 1, characterized in that $R^4$ and $R^5$ are, independently of one another, substituted, especially halogenated, or unsubstituted carbocyclic aromatic groups, preferably substituted or non-substituted phenyl, 1-naphthyl, 2-naphthyl, 2-anthryl, and 9-anthryl.

9. The method of claim 1, characterized in that $R^4$ and $R^5$ are, independently of one another, quinoid substituents or substituents carrying electron-attracting groups.

10. The method of claim 1, characterized in that $R^4$ and $R^5$ are, independently of one another, electron-attracting substituents or substituents carrying electron-attracting groups.

11. The method of claim 1, characterized in that $R^4$ and $R^5$ are, independently of one another, substituted or non-substituted homologs of carbocyclic aromatic groups, preferably any linked and bound substituted or non-substituted biphenyl, binaphthyl, bianthryl and pyrenyl.

12. The method of claim 1, characterized in that $R^4$ and $R^5$ are, independently of one another, substituted or non-substituted heteroaromatic groups, preferably substituted or non-substituted 2-pyridyl, 3-pyridyl, 4-pyridyl, 2-quinolyl, 3-quinolyl, 4-quinolyl, 5-quinolyl, 6-quinolyl, 7-quinolyl, 8-quinolyl, 2-thienyl, and 3-thienyl.

13. The method of claim 1, characterized in that $R^4$ and $R^5$ are, independently of one another, substituted or non-substituted homologs of heteroaromatic groups, preferably any linked and bound substituted or non-substituted bipyridyl, biquinolyl and bithienyl.

14. The method of claim 1, characterized in that the two substituents $R^4$ and $R^5$ together with the boron atom form a correspondingly boron-containing heterocycle that can contain, in addition to carbon, even other heteroatoms such as in particular oxygen and nitrogen.

15. The method of claim 1, in which bora-tetraazapentalene is a p-dopant.

16. Electronic, optoelectronic or electroluminescent structural element made according to the method of claim 1.

* * * * *